United States Patent
Kang et al.

(10) Patent No.: US 8,036,807 B2
(45) Date of Patent: Oct. 11, 2011

(54) CONTROL STRATEGY FOR TRANSITIONING AMONG COMBUSTION MODES IN AN INTERNAL COMBUSTION ENGINE

(75) Inventors: Jun-Mo Kang, Ann Arbor, MI (US); Chen-Fang Chang, Troy, MI (US); Allen B. Rayl, Waterford, MI (US); Vijay Ramappan, Novi, MI (US); Peter Kafarnik, Eltville-Erbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 400 days.

(21) Appl. No.: 12/400,090

(22) Filed: Mar. 9, 2009

(65) Prior Publication Data

US 2009/0234556 A1    Sep. 17, 2009

Related U.S. Application Data

(60) Provisional application No. 61/035,607, filed on Mar. 11, 2008.

(51) Int. Cl.
*F02B 17/00* (2006.01)
*G06F 17/00* (2006.01)
*F02D 41/18* (2006.01)

(52) U.S. Cl. ..................... 701/102; 123/295

(58) Field of Classification Search .................. 701/102, 701/103, 111; 123/295, 305, 481, 294
See application file for complete search history.

(56) References Cited

U.S. PATENT DOCUMENTS

| | | | |
|---|---|---|---|
| 6,971,365 B1 | 12/2005 | Najt | |
| 6,994,072 B2 | 2/2006 | Kuo | |
| 7,021,277 B2 | 4/2006 | Kuo | |
| 7,059,281 B2 | 6/2006 | Kuo | |
| 7,128,047 B2 | 10/2006 | Kuo | |
| 7,328,683 B2 | 2/2008 | Weiss et al. | |
| 7,346,446 B2 | 3/2008 | Kang | |
| 7,478,620 B2 * | 1/2009 | Kuo et al. | 123/294 |
| 7,540,270 B2 * | 6/2009 | Kang et al. | 123/295 |
| 7,565,892 B1 * | 7/2009 | Cleary et al. | 123/295 |
| 2006/0196469 A1 | 9/2006 | Kuo | |
| 2007/0261672 A1 | 11/2007 | Lippert | |
| 2009/0205612 A1 | 8/2009 | Wermuth | |
| 2009/0229564 A1 | 9/2009 | Kang | |

FOREIGN PATENT DOCUMENTS

| | | |
|---|---|---|
| JP | 2004-176610 | 6/2004 |
| JP | 2005-325818 | 11/2005 |
| JP | 2007-138928 | 6/2007 |

* cited by examiner

*Primary Examiner* — Hieu T Vo

(57) ABSTRACT

A method for operating an internal combustion engine having a plurality of controllable engine actuators includes operating the engine in a first combustion mode using a first control scheme while simultaneously simulating operating the engine in a second combustion mode using a second control scheme and in accordance with simulated control settings for the plurality of controllable engine actuators, and transitioning operation of the engine to the second combustion mode using the second control scheme and initially in accordance with the simulated control settings for the plurality of controllable engine actuators.

16 Claims, 4 Drawing Sheets

CONTROL STRATEGY FOR TRANSITIONING AMONG COMBUSTION MODES IN AN INTERNAL COMBUSTION ENGINE

CROSS REFERENCE TO RELATED APPLICATIONS

This application claims the benefit of U.S. Provisional Application No. 61/035,607 filed on Mar. 11, 2008 which is hereby incorporated herein by reference.

TECHNICAL FIELD

This disclosure relates to operation and control of internal combustion engines.

BACKGROUND

The statements in this section merely provide background information related to the present disclosure and may not constitute prior art.

Known spark-ignition (SI) engines introduce an air/fuel mixture into each cylinder which is compressed in a compression stroke and ignited by a spark plug. Known compression ignition engines inject pressurized fuel into a combustion cylinder near top dead center (TDC) of the compression stroke which ignites upon injection. Combustion for both gasoline engines and diesel engines involves premixed or diffusion flames controlled by fluid mechanics.

SI engines can operate in a variety of different combustion modes, including a homogeneous SI combustion mode and a stratified-charge spark-ignition (SC-SI) combustion mode. SI engines can be configured to operate in a homogeneous-charge compression-ignition (HCCI) combustion mode, also referred to interchangeably as controlled auto-ignition (HCCI) combustion, under predetermined speed/load operating conditions. The controlled auto-ignition (HCCI) combustion comprises a distributed, flameless, auto-ignition combustion process that is controlled by oxidation chemistry. An engine operating in the controlled auto-ignition (HCCI) combustion mode has a cylinder charge that is preferably homogeneous in composition, temperature, and residual exhaust gases at intake valve closing time. Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxides (NOx) emissions. The homogeneous air/fuel mixture minimizes occurrences of rich zones that form smoke and particulate emissions.

Controlled auto-ignition (HCCI) combustion depends strongly on factors such as cylinder charge composition, temperature, and pressure at intake valve closing. Hence, the control inputs to the engine must be carefully coordinated to ensure auto-ignition combustion. Controlled auto-ignition (HCCI) combustion strategies may include using an exhaust recompression valve strategy. The exhaust recompression valve strategy includes controlling a cylinder charge temperature by trapping hot residual gas from a previous engine cycle by adjusting valve close timing. In the exhaust recompression strategy, the exhaust valve closes before top-dead-center (TDC) and the intake valve opens after TDC creating a negative valve overlap (NVO) period in which both the exhaust and intake valves are closed, thereby trapping the exhaust gas. The opening timings of the intake and exhaust valves are preferably symmetrical relative to TDC intake. Both a cylinder charge composition and temperature are strongly affected by the exhaust valve closing timing. In particular, more hot residual gas from a previous cycle can be retained with earlier closing of the exhaust valve leaving less room for incoming fresh air mass, thereby increasing cylinder charge temperature and decreasing cylinder oxygen concentration. In the exhaust recompression strategy, the exhaust valve closing timing and the intake valve opening timing are measured by the NVO period.

In addition to a valve control strategy, there must be a suitable fuel injection strategy for combustion. At low fueling rates (e.g., <7 mg/cycle at 1000 rpm in an exemplary 0.55 L combustion chamber volume) the cylinder charge may not be hot enough for Controlled auto-ignition (HCCI) combustion even with maximum allowable NVO, leading to partial-burn or misfire.

Different combustion modes in similar speed/load situations can have performance differences relating to engine stability, emissions, and fuel economy. Engine operation can include transitioning to a particular combustion mode having a preferred performance in a particular situation. Selecting a preferred combustion mode in which to operate can be based upon which combustion mode results in preferred performance at a particular engine load and speed. When a change in speed and/or engine load warrants a transition to a different combustion mode, a transition strategy will be performed and the engine will transition to the different combustion mode.

Known risks associated with transitioning engine operation between combustion modes include incomplete combustion, engine misfires, torque disturbances, and increased undesirable emissions.

SUMMARY

A method for operating an internal combustion engine having a plurality of controllable engine actuators includes operating the engine in a first combustion mode using a first control scheme while simultaneously simulating operating the engine in a second combustion mode using a second control scheme and in accordance with simulated control settings for the plurality of controllable engine actuators, and transitioning operation of the engine to the second combustion mode using the second control scheme and initially in accordance with the simulated control settings for the plurality of controllable engine actuators.

BRIEF DESCRIPTION OF THE DRAWINGS

One or more embodiments will now be described, by way of example, with reference to the accompanying drawings, in which.

DETAILED DESCRIPTION

Figure 1:
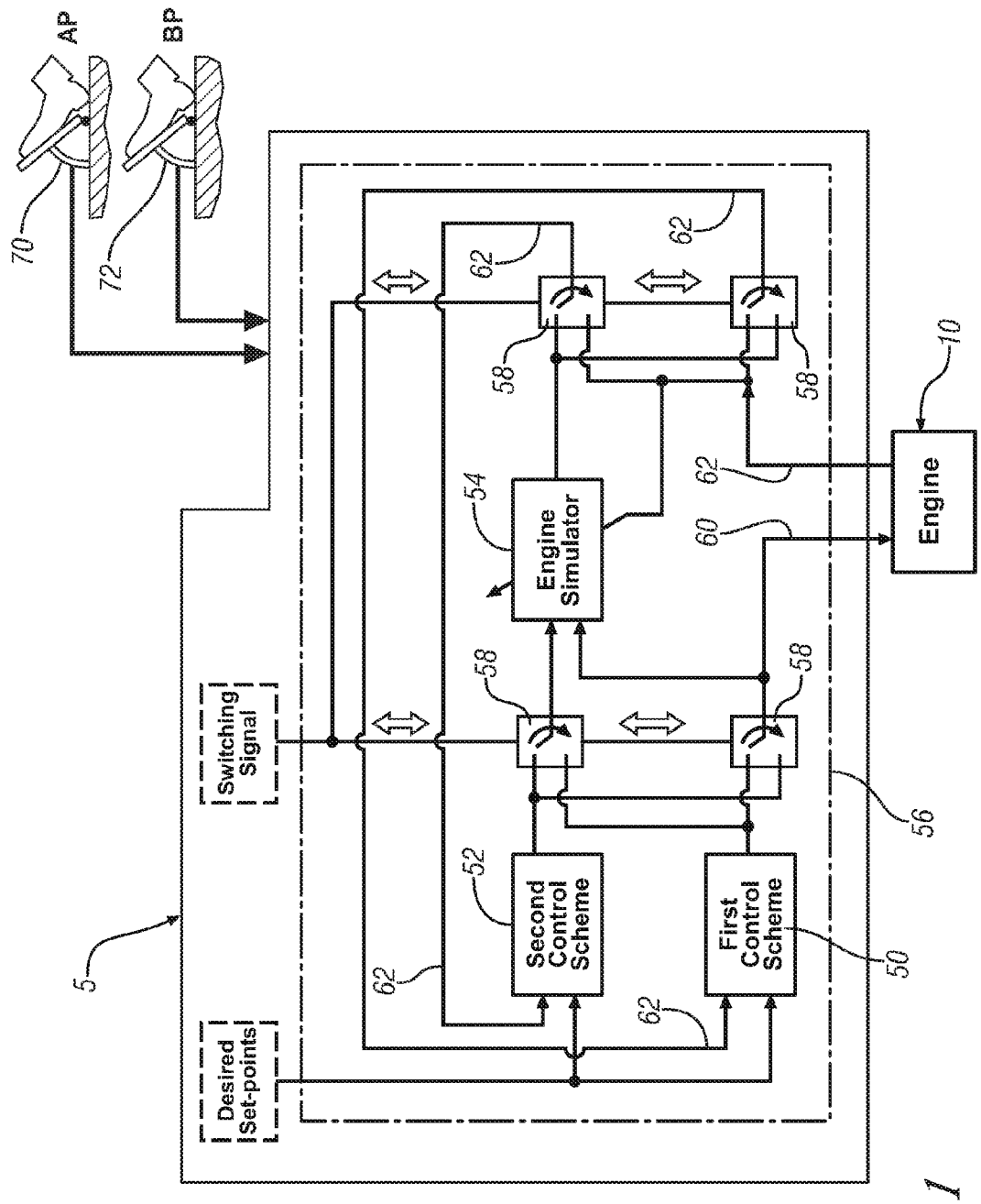
FIG. 1 is a schematic block diagram of a control module for controlling an internal combustion engine, in accordance with the present disclosure.

Referring now to the drawings, wherein the depictions are for the purpose of illustrating certain exemplary embodiments only and not for the purpose of limiting the same, FIG. 1 shows a schematic block diagram of a control module 5 that is signally and operatively connected to an internal combustion engine 10. The engine 10 comprises an internal combustion engine that is configured to operate in a plurality of combustion modes, e.g., in a spark-ignition combustion mode and a controlled auto-ignition combustion mode. Preferably there is a control scheme associated with each of the combustion modes.

The control module 5 includes an executable control strategy 56 for controlling operation of the engine 10 in one of a plurality of control schemes. The control strategy 56 includes a first control scheme 50 and a second control scheme 52 in one embodiment. The control module 5 further includes an engine simulator 54 as an element of the control strategy 56. The first and second control schemes 50 and 52 and the engine simulator 54 are illustrated in FIG. 1, and described herein as discrete elements. Such illustration is for ease of description and it should be recognized that the functions performed by these elements may be combined in one or more devices, e.g., implemented in software, hardware, and/or application-specific integrated circuitry. As such, the first and second control schemes 50 and 52, and engine simulator 54 can be digital computers signally connected to the control module 5, or can be one or more control algorithms and associated calibrations stored in a memory device and executed in the control module 5.

In operation, the control module 5 selectively employs one of the first and second control schemes 50 and 52 to operate the engine 10 in a respective combustion mode. Simultaneously the control module 5 employs the other of the first and second control schemes 50 and 52 to operate an engine simulator 54 (configured to simulate operation of the engine 10) in a respective combustion mode. The control module 5 uses the execution in the other combustion mode and associated simulated engine operation to effect a combustion mode transition that results in employing the other control scheme to operate the engine in the other combustion mode. One of the first and second combustion modes can be a preferred combustion mode that is associated with an engine operating point.

The control module 5 further includes switches 58, control line(s) 60, and signal line(s) 62. Control line(s) 60 may include, for example, discrete control lines or bussed control signals for actuator control. Signal line(s) 62 may include, for example, discrete sensing lines or bussed sensed signals for sensing engine parameters. The switches 58, control line(s) 60, and signal line(s) 62 can be physical devices or represented in the control module 5 as algorithms. The control module 5 controls the switches 58 to employ the first and second control schemes 50 and 52 to control operation of the engine 10 and the engine simulator 54. The control module 5 identifies or selects a preferred combustion mode and associated control scheme to control the engine 10 as described herein below based upon the speed/load operating ranges depicted in FIGS. 3 and 4, diagnostic conditions, and engine operating conditions including, e.g., temperature. Another control scheme operates the engine simulator 54.

The control module 5 is preferably a general-purpose digital computer comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. Preferably, the control module 5 contains the control strategy 56, stored as resident program instructions and calibrations in the non-volatile memory. The control schemes are preferably executed during preset loop cycles. Algorithms are executed by the central processing unit and are configured to monitor inputs from sensing devices and execute control and diagnostic routines to control operation of engine actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The first and second control schemes 50 and 52 are executed in algorithmic code configured to generate respective control settings for engine actuators based upon monitored outputs from sensors. The control settings correspond to actuator settings for devices that include throttle position, spark timing, fuel injection mass and timing, intake and/or exhaust valve lift, timing and phasing, and EGR valve position to control flow of recirculated exhaust gases. Valve lift, timing and phasing includes a two-step valve lift and NVO in one embodiment. The control module 5 monitors operator inputs in the form of input signals from an operator including an accelerator pedal 70 and a brake pedal 72 to determine an operator torque request and monitors engine sensors indicating engine output data, e.g., engine speed and load, intake air mass temperature and flow, coolant temperature, manifold pressure and other engine operating conditions. The control module 5 executes algorithmic code to determine control settings for the actuators, including spark timing (as needed), EGR valve position, intake and exhaust valve timing and two-step lift transition set points, and fuel injection mass and timing to operate the engine 10 in response to the operator torque request.

The engine simulator 54 monitors control settings from one of the control schemes actually controlling the engine 10 and simulates engine operation, including determining simulated engine output data corresponding to those control settings. In one embodiment, the engine simulator 54 comprises one or more algorithms and associated lookup tables containing simulated engine output data corresponding to those control settings. The simulated engine output data preferably includes an engine airflow and takes into account intake manifold dynamics and cylinder air charge for the engine 10. The simulated engine output data may be experimentally determined, and may be adapted to the specific engine during ongoing operation.

Inputs and outputs of the first and second control schemes 50 and 52, the engine simulator 54 and the engine 10 depend upon which of the first and second control schemes 50 and 52 is selected to actually control the engine 10 (preferred control scheme) and which of first and second control schemes 50 and 52 is the control scheme operating the engine simulator 54 (simulation control scheme). Monitored engine actuator measurements include throttle position, spark timing, intake and exhaust valve lift, timing and phasing, and EGR valve position, and are sent to the preferred control scheme and the engine simulator 54 from the signal line(s) 62. The preferred control scheme controls operation of the engine 10. The engine sensors generate data corresponding to actual engine output data. The preferred control scheme receives feedback in the form of the actual engine output data from the engine 10. Concurrently, the simulation control scheme controls operation of the engine simulator 54 and receives simulated engine output data from the engine simulator 54. The control settings from the preferred control scheme and the actual engine output data are communicated to the engine simulator 54 to use in engine simulator adaptation. The control module 5 can also input various desired set points including speed/ load operating ranges into the preferred control scheme and the simulation control scheme.

In one embodiment, the first control scheme 50 is executed in algorithmic code configured to operate the engine 10 in a default combustion mode at all times during engine operation, whether it is the preferred combustion mode actually controlling the engine. The second control scheme 52 is simultaneously executed in algorithmic code configured to operate the engine 10 in an elective combustion mode at all times during engine operation, comprising one of a plurality of elective combustion modes, whether it is the preferred combustion mode actually controlling the engine. The second control scheme(s) 52 can be configured to operate the engine 10 in one of the elective combustion modes, including controlling engine operation during transitioning among a plurality of the combustion modes.

While the engine 10 is operating, the preferred control scheme generates and sends control settings for the engine actuators to control operation of the engine 10, and actual engine output data is generated and sent as feedback to the preferred control scheme. The control settings for the engine actuators from the preferred control scheme are also sent to the engine simulator 54. The simulated engine output data are functions of the control settings from the preferred control scheme. Thus, upon receiving the control settings from the preferred control scheme, the engine simulator 54 determines the simulated engine output data corresponding thereto from lookup tables in one embodiment. Preferably, the engine simulator 54 adapts the simulated engine output data to the monitored engine actuator measurements and the actual engine output data transmitted to the engine simulator 54. The simulated engine output data is used as feedback to the simulation control scheme operating the engine simulator 54. The simulation control scheme determines control settings for the engine actuators of the engine simulator 54 based on the simulated engine output data. Preferably, the engine simulator 54 receives the monitored engine actuator measurements, determines the simulated engine output data, and sends the simulated engine output data at predetermined fixed time intervals preferably based upon the aforementioned loop cycles of the control module 5.

When the control module 5 determines to transition the engine combustion modes, the simulation control scheme operating the engine simulator 54 is prepared to actually control engine operation as the preferred control scheme and initially using the simulation control settings with minimal delay, and with minimal disruption of engine operation. When the control module 5 commands a switch, i.e., a transition, the simulation control scheme operating the engine simulator 54 becomes the preferred control scheme and initiates actual control of the engine 10 initially using the simulated engine output data received from the engine simulator 54. The simulated control scheme operating the engine simulator 54 is now identified as the preferred control scheme and the previously preferred control scheme is now identified as the simulation control scheme operating the engine simulator 54. The newly transitioned preferred control scheme (i.e. former simulation control scheme) now receives the actual engine output data, and the newly transitioned simulation control scheme (i.e. former preferred control scheme) now receives the simulated engine output data from the engine simulator 54 as described hereinabove. The newly transitioned preferred control scheme will send its control settings for the engine actuators to the engine 10 and the engine simulator 54 as described hereinabove. The newly transitioned simulation control scheme will send its control settings only to the engine simulator 54 as described hereinabove.

Events that may necessitate switching engine control out of a combustion mode include operating the engine 10 outside of preferred speed/load operating ranges for the control scheme, and engine faults (e.g. component or system faults) that are detectable using on-board sensing systems and diagnostics routines. Cylinder temperature and/or engine starts may additionally necessitate switching engine control out of a combustion mode.

In operation, the control module 5 identifies one of the combustion modes as a preferred combustion mode corresponding to the engine operating point and a corresponding one of the first and second control schemes as the preferred control scheme. The control module 5 identifies the other of the combustion modes corresponding to the engine operating point and a corresponding one of the first and second control schemes as the simulation control scheme. The preferred control scheme operates the engine 10 and the simulation control scheme operates the engine simulator 54.

Figure 2:
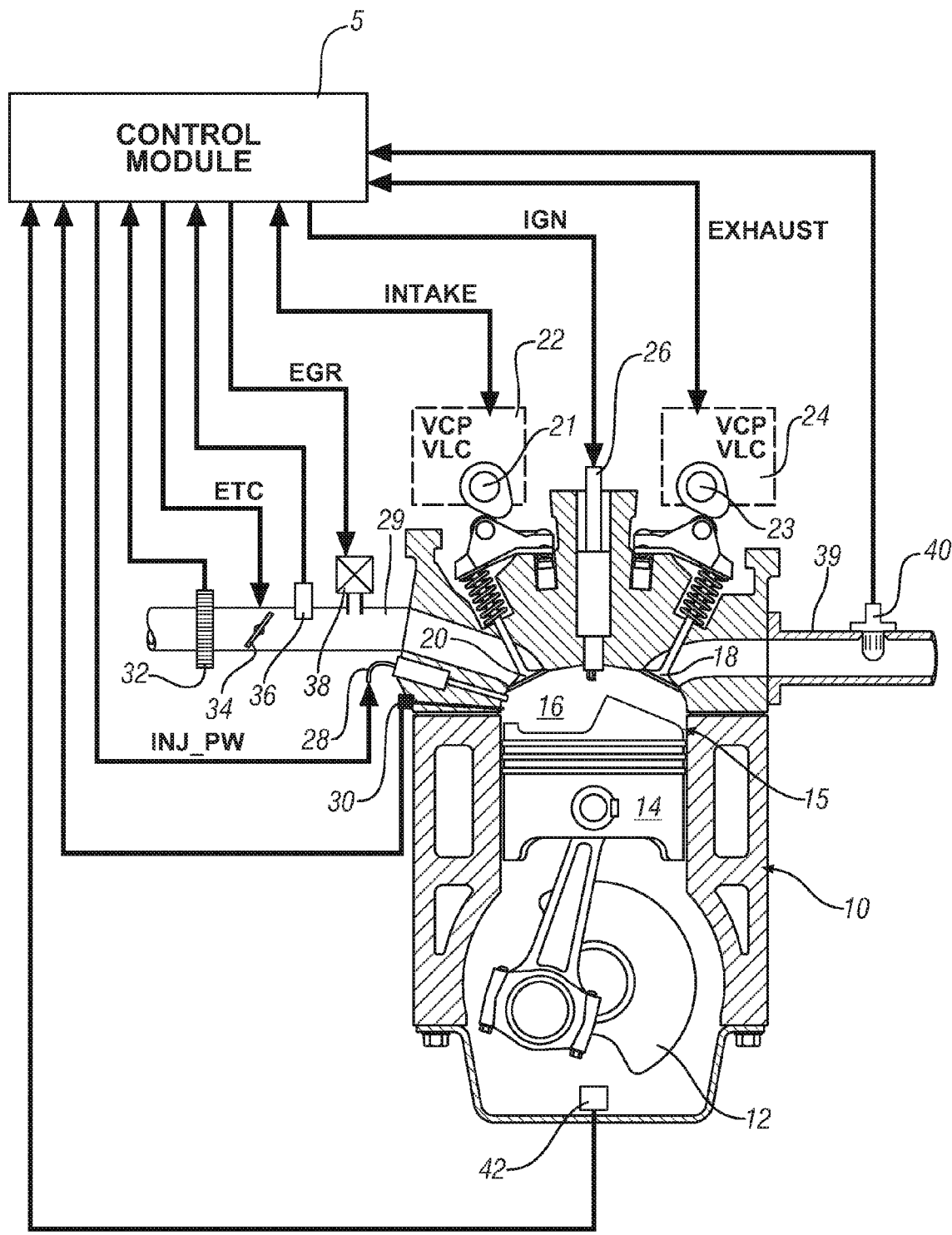
FIG. 2 is a schematic drawing of an exemplary engine system, in accordance with the present disclosure.

FIG. 2 is a schematic drawing of an embodiment of the engine 10 described herein above that is illustrative of the concepts described with reference to FIG. 1. The exemplary engine 10 is selectively operative in a plurality of combustion modes including, a controlled auto-ignition (HCCI) combustion mode, a homogeneous spark-ignition (SI-H) combustion mode, and a stratified-charge spark-ignition (SC-SI) combustion mode. Each combustion mode may be associated with one or more fuel injection strategies, e.g., a single and/or a multiple injection fuel injection strategy for the controlled auto-ignition combustion mode. The engine 10 is selectively operative at a stoichiometric air/fuel ratio and at an air/fuel ratio that is primarily lean of stoichiometry. The disclosure can be applied to various internal combustion engine systems and combustion cycles and can be controlled using the control module 5 described with reference to FIG. 1.

In one embodiment the engine 10 can be coupled to a transmission device (not shown) to transmit tractive power to a driveline of a vehicle (not shown). The transmission can include a hybrid transmission including torque machines operative to transfer tractive power to a driveline.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system comprises airflow ductwork and devices for monitoring and controlling the airflow. The air intake devices preferably include a mass airflow sensor 32 for monitoring mass airflow and intake air temperature. A throttle valve 34 preferably comprises an electronically controlled device that is used to control airflow to the engine 10 in response to a control signal (ETC) from the control module 5. A pressure sensor 36 in the intake manifold 29 is configured to monitor manifold absolute pressure and barometric pressure. An external flow passage recirculates exhaust gases from engine exhaust to the intake manifold 29, having a flow control valve referred to as an exhaust gas recirculation (EGR) valve 38. The control module 5 is operative to control mass flow of exhaust gas to the intake manifold 29 by controlling opening of the EGR valve 38.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift of the intake valve(s) 20 and variably adjust and control phasing of the intake camshaft 21 for each cylinder 15 in response to a control signal (INTAKE) from the control module 5. The exhaust VCP/VLC device 24 preferably comprises a controllable mechanism operative to variably switch and control valve lift of the exhaust valve(s) 18 and variably adjust and control phasing of the exhaust camshaft 23 for each cylinder 15 in response to a control signal (EXHAUST) from the control module 5.

The intake and exhaust VCP/VLC devices 22 and 24 each preferably includes a controllable two-step variable lift control (VLC) mechanism configured to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting the phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors (not shown) to determine rotational positions of the intake and the exhaust camshafts 21 and 23. The VCP/VLC devices 22 and 24 are actuated using one of electro-hydraulic, hydraulic, and electric control force, controlled by the control module 5.

The engine 10 includes a fuel injection system, comprising a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system (not shown).

The engine 10 includes a spark-ignition system (not shown) by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed in one embodiment, a combustion sensor 30 configured to monitor combustion, and an exhaust gas sensor 40 configured to monitor exhaust gases, typically an air/fuel ratio sensor. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The control module 5 executes algorithmic code stored therein to control the aforementioned actuators to form the cylinder charge, including controlling throttle position, spark-ignition timing, fuel injection mass and timing, EGR valve position to control flow of recirculated exhaust gases, and intake and/or exhaust valve timing and phasing on engines so equipped. Valve timing and phasing can include NVO and lift of exhaust valve reopening (in an exhaust re-breathing strategy) in one embodiment. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from the exhaust gas sensor 40.

During engine operation, the throttle valve 34 is preferably substantially wide-open in the controlled auto-ignition (HCCI) combustion modes, e.g., single and double injection controlled auto-ignition (HCCI) combustion modes, with the engine 10 controlled at a lean air/fuel ratio. Substantially wide-open throttle can include operating fully un-throttled, or slightly throttled to create a vacuum in the intake manifold 29 to effect EGR flow. In one embodiment, in-cylinder EGR mass is controlled to a high dilution rate, e.g., greater than 40% of cylinder air charge. The intake and exhaust valves 20 and 18 are in the low-lift valve position and the intake and exhaust lift timing operate with NVO. One or more fuel injection events can be executed during an engine cycle including at least one injection during a compression phase.

During engine operation in the homogeneous spark-ignition (SI-H) combustion mode, the throttle valve 34 is controlled to regulate the airflow. The engine 10 is controlled to a stoichiometric air/fuel ratio, and the intake and exhaust valves 20 and 18 are in the high-lift valve open position and the intake and exhaust lift timing operate with a positive valve overlap. Preferably, a fuel injection event is executed during compression phase of an engine cycle, preferably substantially before TDC. Spark ignition is preferably discharged at a predetermined time subsequent to the fuel injection when air charge within the cylinder is substantially homogeneous.

A stratified-charge spark-ignition (SC-SI) combustion mode includes operating substantially lean of stoichiometry. Fuel injection timing is preferably close in time to the spark ignition timing to prevent the air/fuel mixture from homogenizing into a uniformly disbursed mixture. The injected fuel mass is injected in the combustion chamber 15 with rich layers around the spark plug and leaner air/fuel ratio areas further out at the time of spark ignition. A fuel pulse width can end as the spark event begins or immediately prior thereto.

Figure 3:
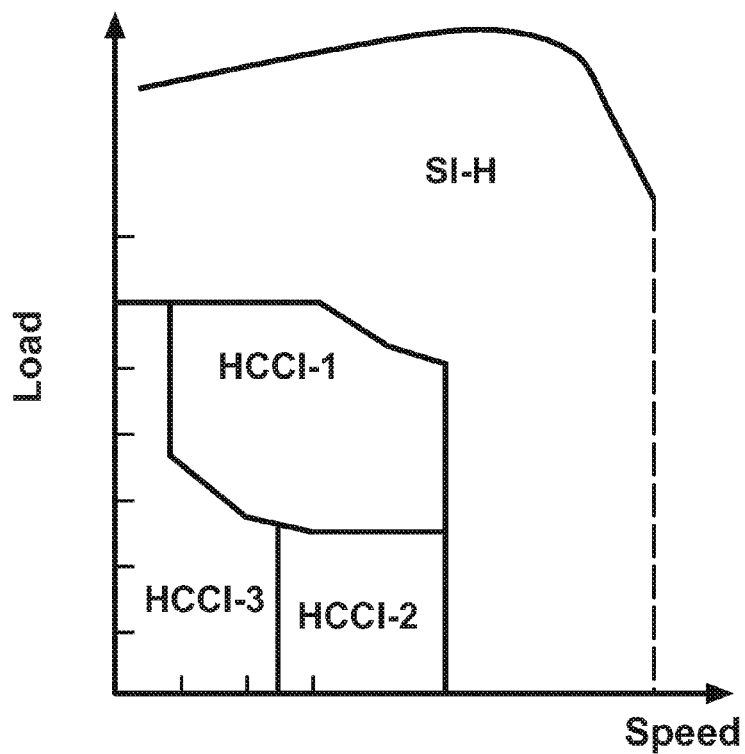
FIG. 3 graphically illustrates exemplary speed and load operating zones for various combustion modes, in accordance with the present disclosure.

FIG. 3 schematically depicts combustion modes including the homogeneous spark-ignition (SI-H) and controlled auto-ignition (HCCI) combustion modes associated with identified engine operating zones. The engine operating zones are defined by and corresponding to states of engine parameters, in this embodiment comprising engine speed and load. The engine load can be derived from engine parameters including the fuel flow and the intake manifold pressure. The combustion modes preferably include the homogeneous spark-ignition (SI-H) combustion mode, a first controlled auto-ignition (HCCI) combustion mode (HCCI-1), a second controlled auto-ignition (HCCI) combustion mode (HCCI-2), and a third controlled auto-ignition (HCCI) combustion mode (HCCI-3). Preferably, each combustion mode is associated with a fuel injection strategy, e.g., the first controlled auto-ignition (HCCI) combustion mode may be associated with a single injection fuel injection strategy. The preferred combustion mode associated with the engine operating zone may be predetermined based upon a specific hardware application and engine operating parameters, including combustion stability, fuel consumption, emissions, engine torque output, and others. Boundaries for the engine operating zones that define the preferred combustion mode can be precalibrated and stored in the control module 5 in one embodiment. The control module 5 transitions engine operation to the preferred combustion mode associated with the engine 10 to increase fuel efficiencies and engine stability, and/or decrease emissions. A change in one of the engine parameters, e.g., speed and load, can effect a change in the engine operating zone. The control module 5 commands a change in the preferred combustion mode associated with a change in the engine operating zone.

Figure 4:
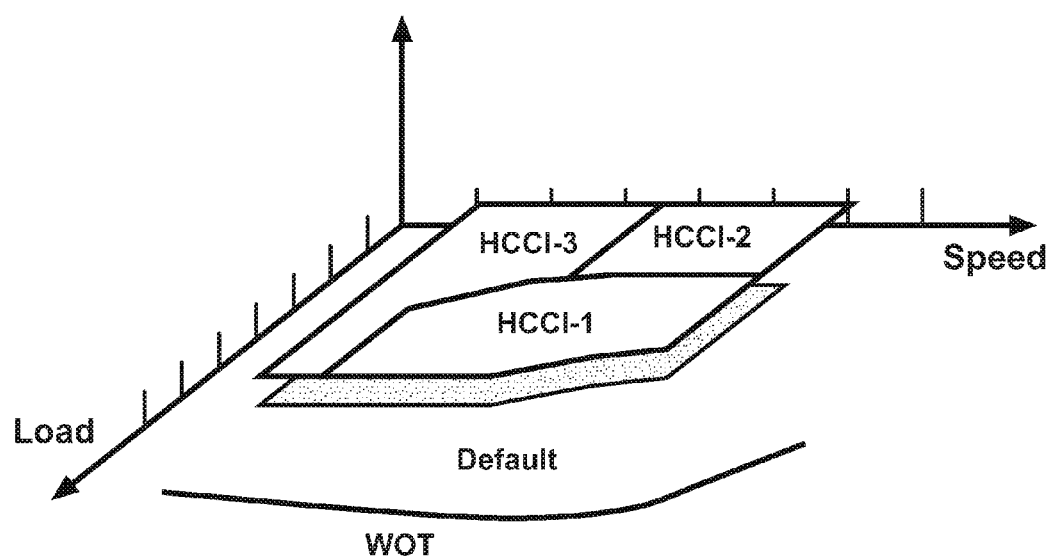
FIG. 4 graphically illustrates an exemplary speed-load map superimposed atop the default combustion mode, in accordance with the present disclosure.

FIG. 4 depicts a control strategy for controlling and operating the engine 10 described with reference to FIGS. 2 and 3 in one of the combustion modes. One of the combustion modes is selected and designated as the default combustion mode. In one embodiment, the homogeneous spark-ignition (SI-H) combustion mode is designated the default combustion mode. The other combustion modes are designated as elective combustion modes. The speed and load operating limit of the default combustion mode is defined in FIG. 4 by the wide-open-throttle line labeled (WOT) which indicates it is executable to operate the engine within the entire speed/load operating zone of the engine 10. The elective combustion modes are superimposed on the default combustion mode to depict the relative speed/load parameters as shown in FIG. 3. The engine 10 can operate in the default combustion mode over the entire speed/load operating zone in this embodiment.

Preferably, the default combustion mode comprises the combustion mode whereat the engine 10 is operative over a broad zone of engine speeds and loads. It is preferable for the engine 10 to operate in the default combustion mode with minimum control of some of the actuators, e.g., VCP/VLC systems 22 and 24, and with minimum feedback from sensors and sensing systems, and with minimum algorithmic executions. Thus the engine 10 can operate over a wide zone of speed/load combinations with limited capability in sensing and actuation. For the exemplary engine 10, the homogeneous spark-ignition (SI-H) combustion mode is the preferred default combustion mode. The other combustion modes, e.g., the HCCI-1 combustion mode, the HCCI-2 combustion mode, and HCCI-3 combustion mode, are the elective combustion modes that are graphically superimposed on the default combustion mode as shown in FIG. 4.

During engine operation, the engine 10 is controlled to operate at a preferred air/fuel ratio and the intake air flow is controlled to achieve the preferred air/fuel ratio. This includes estimating a cylinder air charge based upon engine operation in the selected combustion mode. The throttle valve 34 and intake and exhaust VCP/VLC devices 22 and 24 are controlled to achieve an intake air flowrate based upon the estimated cylinder air charge, including during a transition between the homogeneous spark-ignition (SI-H) and controlled auto-ignition (HCCI) combustion modes. Air flow is controlled by adjusting the throttle valve 34 and the intake and exhaust VCP/VLC devices 22 and 24 to control the opening timing and profiles of the intake and exhaust valve(s) 20 and 18. Operation in the two combustion modes requires different settings for the intake and exhaust VCP/VLC devices 22 and 24 in terms of valve timing and profiles of the intake and exhaust valve(s) 20 and 18 and the throttle valve 34 for throttle position. By way of example, the throttle valve 34 is preferably wide-open in the controlled auto-ignition (HCCI) combustion mode with the engine 10 controlled at a lean air-fuel ratio, whereas the throttle valve 34 is controlled to regulate the air flow and the engine 10 is controlled to a stoichiometric air-fuel ratio in the homogeneous spark-ignition (SI-H) combustion mode.

In operation, the control module 5 executes algorithmic code configured to operate the engine 10 in the default combustion mode at all times during engine operation, whether it is the preferred combustion mode actually controlling the engine. The executed algorithmic code is used to control the engine 10 in the default combustion mode when the control module 5 selects the default combustion mode for actual operation of the engine 10, and is also used to control the engine simulator 54 in the default combustion mode when the control module 5 selects an elective combustion mode.

The control module 5 monitors engine operation including an engine operating point, e.g., a speed/load operating point. The control module 5 identifies an elective combustion mode as the preferred combustion mode based on the engine operating point and identifies the corresponding one of the first and second control schemes 50 and 52 configured to operate the engine in that elective combustion mode as the preferred control scheme and identifies the other one of the first and second control schemes as the simulation control scheme which corresponds to the default combustion mode. The preferred control scheme is employed to control the engine 10 and the simulation control scheme is employed to control the engine simulator 54. The control module 5 commands transitioning to controlling the engine operation using the simulation control scheme when the preferred combustion mode corresponding to the engine operating point is subsequently identified as the default combustion mode. When the engine 10 is operating within an engine operating zone encompassed by one of the elective combustion modes, the control module 5 preferentially effects engine operation to the elective combustion mode by establishing the corresponding control scheme as the preferred control scheme.

The control module 5 simultaneously executes control algorithms configured to operate the engine 10 in the default combustion mode but operating the engine simulator 54. This includes monitoring inputs from sensors and determining actuator settings to operate the engine 10 in the default combustion mode. The control settings for the engine actuators are determined based upon the actual engine output data to meet the operator torque request when operating the engine in the default mode.

In so doing, upon occurrence of an event, e.g., a fault which necessitates or causes the engine to exit the preferred combustion mode, the control module 5 is able to switch operation of the engine 10 from the elective combustion mode to the default combustion mode with minimal delay and with minimal disruption to engine operation. Events which may necessitate switching the engine out of the elective combustion mode can include detection of engine faults using, e.g., on-board sensing systems and diagnostic algorithms, or in-cylinder conditions such as temperature. Engine faults can include component faults of engine sensors or actuators. For example, when a fault is detected by one of the diagnostic algorithms, the control module 5 immediately commands engine operation in the default combustion mode by establishing the preferred control scheme as the control scheme associated with the default combustion mode which heretofore had been operating the engine simulator 54.

Figure 5:
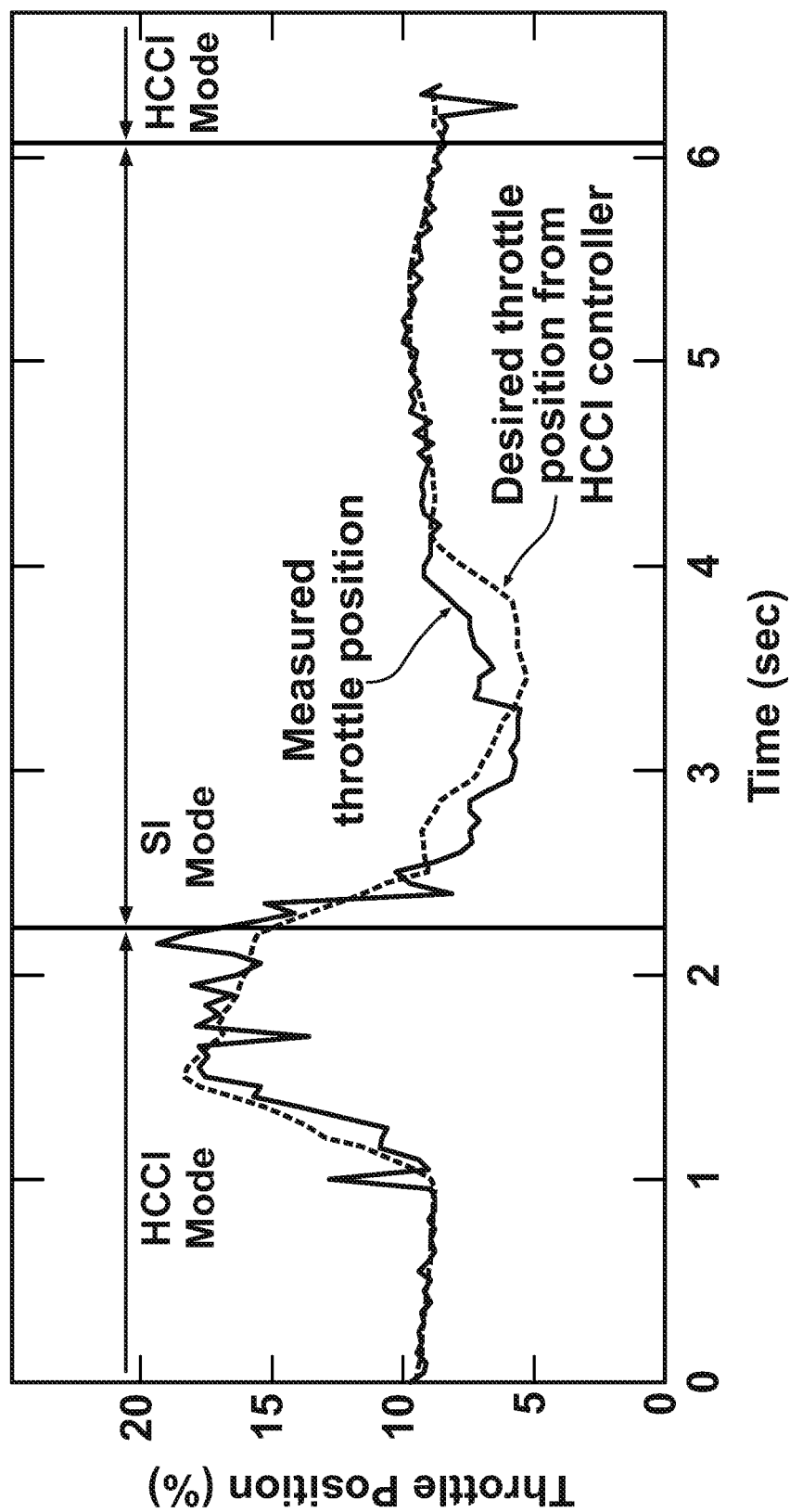
FIG. 5 graphically illustrates an exemplary combustion mode transition, in accordance with the present disclosure.

FIG. 5 shows throttle position as a function of elapsed time during operation of an exemplary engine employing the second control scheme 52 to control of the engine 10 in a controlled auto-ignition (HCCI) combustion. When engine operation transitions to the first control scheme 50, i.e., the homogeneous spark-ignition (SI-H) combustion mode, the desired throttle position of the second control scheme 52 is the throttle position that the second control scheme 52 has signaled to the engine simulator 54. As the first control scheme 50 operates the engine in a particular combustion mode, the second control scheme 52 is also operating the engine simulator 54 in the same combustion mode. As FIG. 5 depicts, during engine operation transitioning, the throttle position remains continuous with minimal delay, and with minimal disruption of engine operation.

While the exemplary engine 10 is described as operating with only two control schemes, a plurality of two or more control schemes may control the engine 10. With two or more control schemes, the first control scheme 50 may be designated a default control scheme and the remaining control schemes each may separately control respective engine simulators. Similarly to FIG. 4, each of the plurality of engine simulators will have control settings for the engine actuators inputted from the preferred control scheme, the monitored engine actuator measurements, and the actual engine output data. Each of the plurality of engine simulators will send the simulated engine output data to a corresponding control scheme that will process the data and then control the respective engine simulator based on the simulated engine output data.

The same methods as described hereinabove are applicable to engines operative in multiple combustion modes. Another exemplary engine comprises a diesel engine selectively operative in a compression-ignition (CI) combustion mode, a premixed-charge compression ignition (PCCI) combustion mode, and other combustion modes. In one embodiment of such a multi-mode diesel engine, the CI combustion mode is designated as the default mode and other combustion modes, e.g., the PCCI mode are superimposed on the default mode.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an internal combustion engine having a plurality of controllable engine actuators, the method comprising:
    operating the engine in a first combustion mode using a first control scheme while simultaneously simulating operating the engine in a second combustion mode using a second control scheme and in accordance with simulated control settings for the plurality of controllable engine actuators; and
    transitioning operation of the engine to the second combustion mode using the second control scheme and initially in accordance with the simulated control settings for the plurality of controllable engine actuators.

2. The method of claim 1, wherein the second combustion mode comprises a default combustion mode effective over a first range of engine operating points.

3. The method of claim 2, wherein the default combustion mode comprises a homogeneous spark-ignition combustion mode.

4. The method of claim 2, wherein the first combustion mode comprises an elective combustion mode effective over a second range of engine operating points consisting of less than the entire first range of engine operating points.

5. The method of claim 4, wherein the elective combustion mode comprises one of a controlled auto-ignition combustion mode and a stratified-charge spark-ignition combustion mode.

6. The method of claim 1, wherein transitioning operation of the engine to the second control scheme occurs when an engine fault is detected.

7. The method of claim 1, further comprising:
    simulating operating the engine in the first combustion mode using the first control scheme and in accordance with simulated control setting for the plurality of the engine actuators upon transitioning operation of the engine to the second combustion mode.

8. The method of claim 1, wherein the second control scheme is configured to operate the engine in one of a plurality of second combustion modes.

9. The method of claim 8, wherein the plurality of second combustion modes comprises a spark-ignition combustion mode and a controlled auto-ignition combustion mode.

10. Method for operating an internal combustion engine having a plurality of controllable engine actuators, the method comprising:
    employing a first control scheme to operate the engine in a first one of a plurality of combustion modes and simultaneously employing a second control scheme to operate an engine simulator in a default combustion mode in accordance with simulated control settings for the plurality of controllable engine actuators; and transitioning to employing the second control scheme to operate the engine in the default combustion mode and initially in accordance with the simulated control settings for the plurality of controllable engine actuators.

11. The method of claim 10, wherein the default combustion mode comprises a spark-ignition combustion mode.

12. The method of claim 10, wherein the first one of the plurality of combustion modes comprises a compression-ignition combustion mode and the default combustion mode comprises a premixed-charge compression ignition combustion mode.

13. The method of claim 10, further comprising:
monitoring an engine operating point;
transitioning to employing the first control scheme to operate the engine in a second one of the plurality of combustion modes when the engine operating point is within a predetermined operating zone for the second combustion mode.

14. The method of claim 10, wherein transitioning to employing the second control scheme to operate the engine in the default combustion mode occurs when an engine fault is detected.

15. The method of claim 10, further comprising:
transitioning among the plurality of combustion modes based upon an engine operating point and respective predetermined operating zones for each of the plurality of combustion modes.

16. The method of claim 15, further comprising:
transitioning engine operation from a first one of the plurality of combustion modes to a second one of the plurality of combustion modes through an intermediate engine operation in the default combustion mode.

* * * * *